United States Patent
Chaiken et al.

(10) Patent No.: US 11,126,502 B2
(45) Date of Patent: Sep. 21, 2021

(54) SYSTEMS AND METHODS FOR PROACTIVELY PREVENTING AND PREDICTING STORAGE MEDIA FAILURES

(71) Applicant: Dell Products L.P., Round Rock, TX (US)

(72) Inventors: Craig Lawrence Chaiken, Pflugerville, TX (US); Siva Subramaniam Rajan, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 221 days.

(21) Appl. No.: 16/421,025

(22) Filed: May 23, 2019

(65) Prior Publication Data

US 2020/0371878 A1   Nov. 26, 2020

(51) Int. Cl.
  *G06F 11/00*   (2006.01)
  *G06F 11/14*   (2006.01)
  *G06F 9/4401*  (2018.01)
  *G11B 20/18*   (2006.01)

(52) U.S. Cl.
  CPC ........ *G06F 11/1417* (2013.01); *G06F 9/4401* (2013.01); *G06F 11/142* (2013.01); *G06F 11/1435* (2013.01); *G11B 20/1803* (2013.01)

(58) Field of Classification Search
  CPC .............. G06F 11/1417; G06F 11/142; G06F 11/1435; G06F 11/0727; G06F 11/0793; G06F 11/2278; G06F 11/2284; G06F 11/3452; G06F 9/4401; G11B 20/1803
  See application file for complete search history.

(56) References Cited

U.S. PATENT DOCUMENTS

| | | | | |
|---|---|---|---|---|
| 9,229,796 B1* | 1/2016 | Ma | ...................... | G06F 11/3452 |
| 2005/0149781 A1* | 7/2005 | Lempel | ............... | G06F 11/1064 |
| | | | | 714/718 |
| 2015/0378627 A1* | 12/2015 | Kitazawa | ............ | G06F 21/6209 |
| | | | | 711/162 |
| 2016/0085649 A1* | 3/2016 | Matthews | ........... | G06F 11/1415 |
| | | | | 714/6.12 |
| 2016/0124788 A1* | 5/2016 | Jacoby | ................ | G06F 11/3034 |
| | | | | 714/819 |
| 2017/0091028 A1* | 3/2017 | Golan | .................. | G11C 29/028 |

* cited by examiner

*Primary Examiner* — Joseph D Manoskey
(74) *Attorney, Agent, or Firm* — Jackson Walker L.L.P.

(57) ABSTRACT

A method may include, during a boot of an information handling system, detecting a soft failure associated with a read request to storage media of the information handling system wherein the soft failure is not visible to an operating system of the information handling system and in response to detecting the soft failure, rewriting a sector of the storage media affected by the soft failure to correct the soft failure.

18 Claims, 5 Drawing Sheets

SYSTEMS AND METHODS FOR PROACTIVELY PREVENTING AND PREDICTING STORAGE MEDIA FAILURES

TECHNICAL FIELD

The present disclosure relates in general to information handling systems, and more particularly to systems and methods for proactively preventing and predicting storage media failures.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

The term "storage media" may in general refer to any system, apparatus, or device configured to store electronic data for a period of time. Thus, such term may refer to volatile memories, non-volatile memories, hard disk drives, solid state drives, and other types of storage media.

On a hard disk drive using spinning storage media, single bit errors may affect sectors of the hard disk drive over time. Such errors may be automatically corrected using error correction codes, but once single bit errors grow to multi-bit errors, errors may become uncorrectable.

On the other hand, solid state drives may be susceptible to data decay, in which charged cells in the solid state drive may slowly decay over time. In addition, solid state drive use may lead to wear in which cells may decay at an increased pace.

Slow decay of storage media contents may effectively be resolved by rewriting sectors. The most critical sectors, boot sectors, are often primarily read-only sectors and are rarely rewritten, and are thus most susceptible to slow decay. Accordingly, the most critical sectors for booting are often the least resilient sectors for storage media failures.

SUMMARY

In accordance with the teachings of the present disclosure, the disadvantages and problems associated with existing approaches to minimizing storage media failures in an information handling system may be reduced or eliminated.

In accordance with embodiments of the present disclosure, a method may include, during a boot of an information handling system, detecting a soft failure associated with a read request to storage media of the information handling system wherein the soft failure is not visible to an operating system of the information handling system and in response to detecting the soft failure, rewriting a sector of the storage media affected by the soft failure to correct the soft failure.

In accordance with these and other embodiments of the present disclosure, an information handling system may include a processor and a failure analysis module comprising a program of instructions, the failure analysis module configured to, when read and executed by the processor during a boot of the information handling system, detect a soft failure associated with a read request to storage media of the information handling system wherein the soft failure is not visible to an operating system of the information handling system and in response to detecting the soft failure, rewrite a sector of the storage media affected by the soft failure to correct the soft failure.

In accordance with these and other embodiments of the present disclosure, an article of manufacture may include a non-transitory computer-readable medium and computer-executable instructions carried on the computer-readable medium, the instructions readable by a processor, the instructions, when read and executed, for causing the processor to, in an information handling system, detect a soft failure associated with a read request to storage media of the information handling system wherein the soft failure is not visible to an operating system of the information handling system and in response to detecting the soft failure, rewrite a sector of the storage media affected by the soft failure to correct the soft failure.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Preferred embodiments and their advantages are best understood by reference to FIGS. 1 through 6, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal data assistant (PDA), a consumer electronic device, a network storage device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, power supplies, air movers (e.g., fans and blowers) and/or any other components and/or elements of an information handling system.

Figure 1:
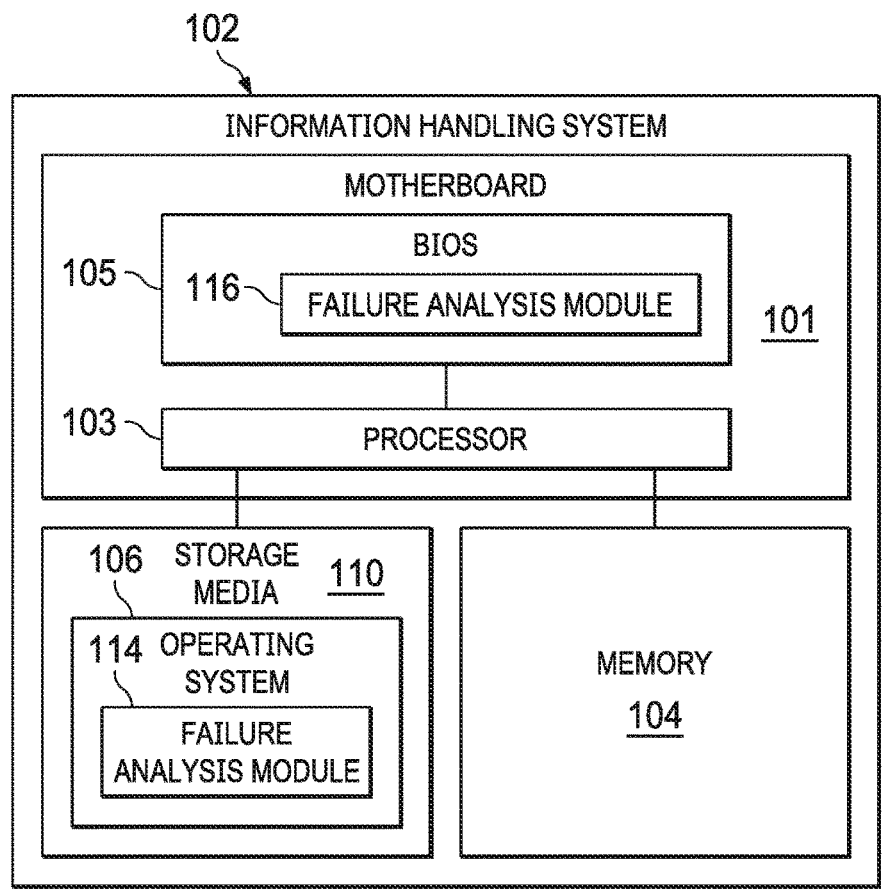
FIG. 1 illustrates a block diagram of an example information handling system, in accordance with embodiments of the present disclosure.

FIG. 1 illustrates a block diagram of an example of an information handling system 102, in accordance with embodiments of the present disclosure. As depicted, information handling system 102 may include a motherboard 101, a memory 104, and storage media 110.

Motherboard 101 may include a circuit board configured to provide structural support for one or more information handling resources of information handling system 102 and/or electrically couple one or more of such information handling resources to each other and/or to other electric or electronic components external to information handling system 102. As shown in FIG. 1, motherboard 101 may include a processor 103, a BIOS 105, and one or more other information handling resources.

Processor 103 may comprise any system, device, or apparatus operable to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104, storage media 110, and/or another component of information handling system 102.

BIOS 105 may be communicatively coupled to processor 103 and may include any system, device, or apparatus configured to identify, test, and/or initialize information handling resources of information handling system 102, and/or initialize interoperation of information handling system 102 with other information handling systems. "BIOS" may broadly refer to any system, device, or apparatus configured to perform such functionality, including without limitation, a Unified Extensible Firmware Interface (UEFI). In some embodiments, BIOS 105 may be implemented as a program of instructions that may be read by and executed on processor 103 to carry out the functionality of BIOS 105. In these and other embodiments, BIOS 105 may comprise boot firmware configured to be the first code executed by processor 103 when information handling system 102 is booted and/or powered on. As part of its initialization functionality, code for BIOS 105 may be configured to set components of information handling system 102 into a known state, so that one or more applications (e.g., an operating system or other application programs) stored on compatible media (e.g., disk drives) may be executed by processor 103 and given control of information handling system 102.

As shown in FIG. 1, BIOS 105 may include a failure analysis module 116. Failure analysis module 116 may comprise any program of instructions that may be read and executed by processor 103, and when executed by processor 103, provides for proactive prevention and prediction of failures of storage media 110 as described in greater detail below.

Memory 104 may be communicatively coupled to processor 103 and may comprise any system, device, or apparatus operable to retain program instructions or data for a period of time. Memory 104 may comprise random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to information handling system 102 is turned off. Although memory 104 is shown external to motherboard 101 in FIG. 1, in some embodiments, memory 104 may reside on motherboard 101.

Storage media 110 may be communicatively coupled to processor 103 and may include any system, device, or apparatus operable to store information processed by processor 103. Storage media 110 may include, for example, a direct access storage device (e.g., a hard disk drive, a solid state drive, etc.)

As shown in FIG. 1, storage media 110 may have stored therein an operating system 106. Operating system 106 may be any program of executable instructions, or aggregation of programs of executable instructions, configured to manage and/or control the allocation and usage of hardware resources (e.g., processor 103, memory 104, storage media 110, and/or other information handling resources) and provide an interface between such hardware resources and application programs hosted by operating system 106, and thus may act as a host for application programs to be executed by information handling system 102. Active portions of operating system 106 may be loaded into memory 104 and read and executed by processor 103 in order to carry out the functionality of operating system 106. Examples of operating system 106 may include, without limitation, Windows, MacOS, UNIX, LINUX, Android, iOS, or any other closed or open source operating system.

As shown in FIG. 1, operating system 106 may have stored thereon a failure analysis module 114. Failure analysis module 114 may comprise any program of instructions that may be read and executed by processor 103, and when executed by processor 103, provides for proactive prevention and prediction of storage media failures, as described in greater detail below. In some embodiments, failure analysis module 114 may execute as part of a filter driver of operating system 106.

In addition to motherboard 101, processor 103, memory 104, BIOS 105, and storage media 110, information handling system 102 may include one or more other information handling resources.

In operation, failure analysis module 116 of BIOS 105 and/or failure analysis module 114 of operating system 106 may, during boot/initialization of operating system 106, detect and correct soft failures of storage media 110. Soft failures may be those errors that can be corrected, either by using an error correction code to correct an error or an error that can be overcome with a retry of the command in to which the error occurs as a response. Such error detection may be performed by comparing status commands (e.g., Self-Monitoring, Analysis, and Reporting Technology or "SMART" commands) issued to storage media 110 before and after each read of data from storage media 110 during boot/initialization of operating system 106. If the status command comparison responses indicate a change in error counts occurring due to the read request, an error has occurred and failure analysis module 116 and/or failure analysis module 114 may correct the error by writing back the data read in response to the read request. Such writing back of read data may correct error correction code errors and, if necessary, move the sector which is the target of the read request to a spare sector of storage media 110. In addition, based on the number of spare sectors and a rate of use of spare sectors, failure analysis module 116 and/or failure analysis module 114 may predict when a catastrophic failure of storage media 110 may occur, as described in greater detail below.

In addition, in operation, failure analysis module 116 of BIOS 105 and/or failure analysis module 114 of operating system 106 may, at regular, periodic intervals (e.g., once per month) force all static (e.g., never written to) boot sectors of storage media 110 to be written back to storage media 110. For solid state drives, such process may correct error correction code failures and/or recharge any solid state drive memory cells that may have started to discharge. For rotating media drives, such process may correct error correction code failures and force faulty sectors to be relocated to another sector of storage media 110.

Functionality of failure analysis module 116 and failure analysis module 114 is further illustrated below in FIGS. 2-6 and the descriptions thereof.

Figure 2:
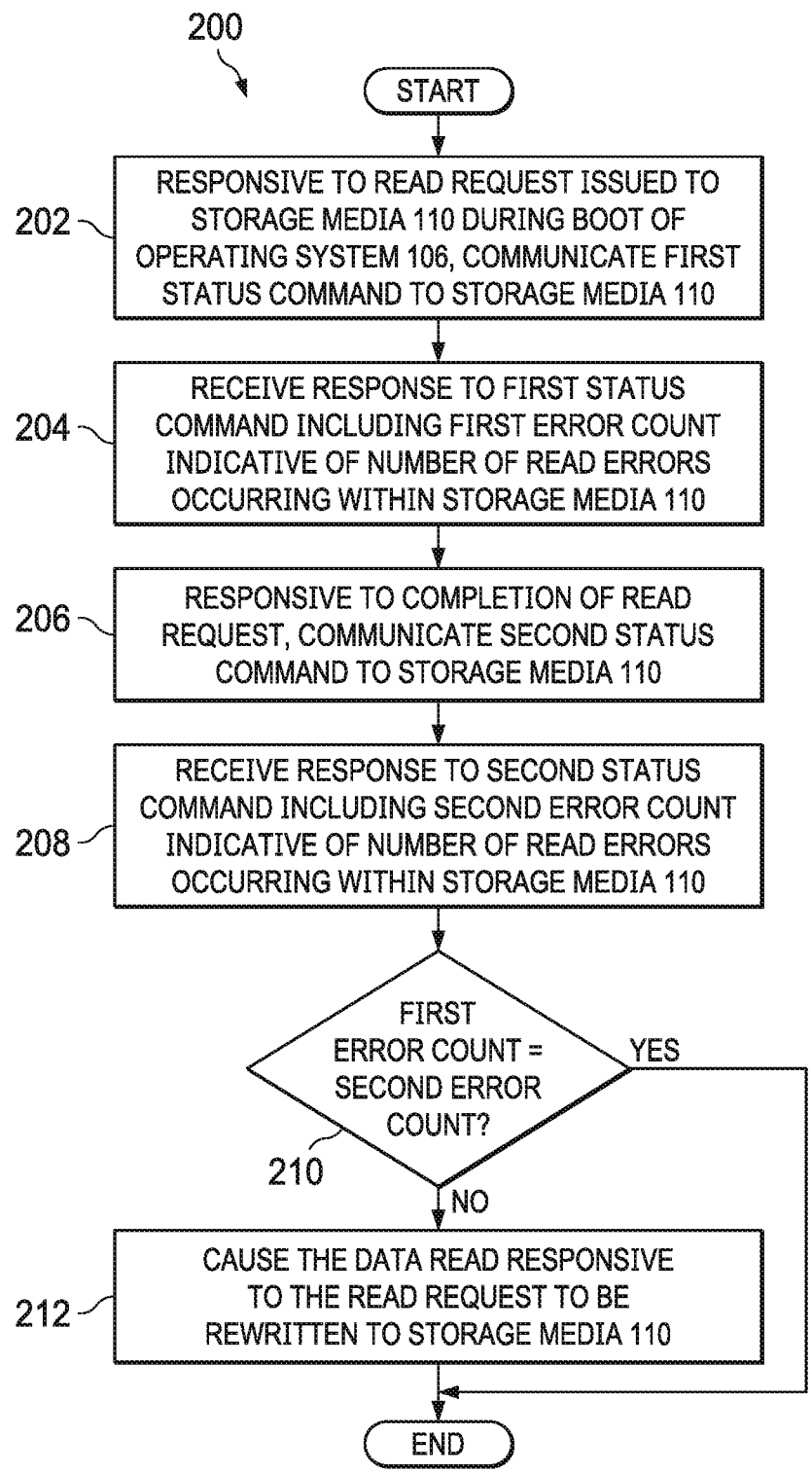
FIG. 2 illustrates a flow chart of an example method for detecting soft failures of storage media using a failure analysis module of a BIOS, in accordance with embodiments of the present disclosure.

FIG. 2 illustrates a flow chart of an example method 200 for detecting soft failures of storage media 110 using failure analysis module 116 of BIOS 105, in accordance with embodiments of the present disclosure. According to some embodiments, method 200 may begin at step 202. As noted above, teachings of the present disclosure may be implemented in a variety of configurations of information handling system 102. As such, the preferred initialization point for method 200 and the order of the steps comprising method 200 may depend on the implementation chosen.

At step 202, failure analysis module 116 may, responsive to a read request issued to storage media 110 during boot of operating system 106 (e.g., to a boot sector of storage media 110), communicate a first status command (e.g., a SMART command) to storage media 110. At step 204, a response to the first status command may be received by failure analysis module 116, wherein such response includes a first error count indicative of the number of read errors occurring within storage media 110.

At step 206, failure analysis module 116 may, responsive to completion of the read request issued to storage media 110, communicate a second status command (e.g., a SMART command) to storage media 110. At step 208, a response to the second status command may be received by failure analysis module 116, wherein such response includes a second error count indicative of the number of read errors occurring within storage media 110.

At step 210, failure analysis module 116 may compare the first error count to the second error count. A difference between the first error count and second error count may indicate the occurrence of an error during the read request. If the first error count and the second error count differ, method 200 may proceed to step 212. Otherwise, method 200 may end. In some embodiments, rather than determine whether the first error count and the second error count are different, failure analysis module 116 may instead determine if the second error count exceeds the first error count by a threshold, and may proceed to step 212 (instead of ending method 200) if such threshold is exceeded.

At step 212, in response to the occurrence of an error during the read request, failure analysis module 116 may cause the data read responsive to the read request to be rewritten to storage media 110. The result of such rewriting of data may be to: (i) correct error correction code data that may be damaged; (ii) automatically relocate sectors that are unreliable; and (iii) in a solid state drive, recharge memory cells that have partially discharged. After completion of step 212, method 200 may end.

Although FIG. 2 discloses a particular number of steps to be taken with respect to method 200, method 200 may be executed with greater or fewer steps than those depicted in FIG. 2. In addition, although FIG. 2 discloses a certain order of steps to be taken with respect to method 200, the steps comprising method 200 may be completed in any suitable order.

Method 200 may be implemented using information handling system 102 or any other system operable to implement method 200. In certain embodiments, method 200 may be implemented partially or fully in software and/or firmware embodied in computer-readable media.

Figure 3:
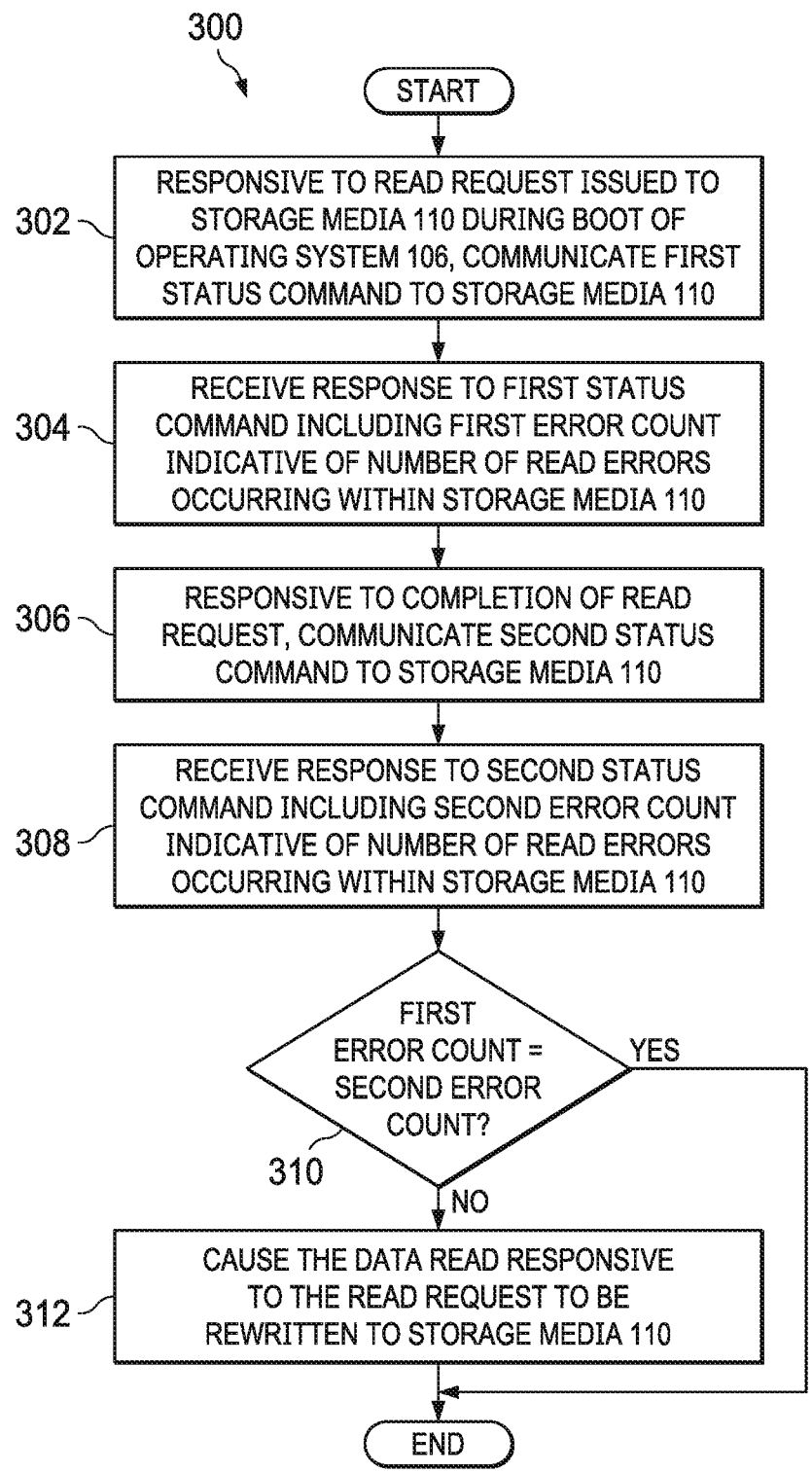
FIG. 3 illustrates a flow chart of an example method for detecting soft failures of storage media using a failure analysis module of an operating system, in accordance with embodiments of the present disclosure.

FIG. 3 illustrates a flow chart of an example method 300 for detecting soft failures of storage media 110 using failure analysis module 114 of operating system 106, in accordance with embodiments of the present disclosure. According to some embodiments, method 300 may begin at step 302. As noted above, teachings of the present disclosure may be implemented in a variety of configurations of information handling system 102. As such, the preferred initialization point for method 300 and the order of the steps comprising method 300 may depend on the implementation chosen.

At step 302, failure analysis module 114 may, responsive to a read request issued to storage media 110 during boot of operating system 106 (e.g., to a boot sector of storage media 110), communicate a first status command (e.g., a SMART command) to storage media 110. At step 304, a response to the first status command may be received by failure analysis module 114, wherein such response includes a first error count indicative of the number of read errors occurring within storage media 110.

At step 306, failure analysis module 114 may, responsive to completion of the read request issued to storage media 110, communicate a second status command (e.g., a SMART command) to storage media 110. At step 308, a response to the second status command may be received by failure analysis module 114, wherein such response includes a second error count indicative of the number of read errors occurring within storage media 110.

At step 310, failure analysis module 114 may compare the first error count to the second error count. A difference between the first error count and second error count may indicate the occurrence of an error during the read request. If the first error count and the second error count differ, method 300 may proceed to step 312. Otherwise, method 300 may end. In some embodiments, rather than determine whether the first error count and the second error count are different, failure analysis module 114 may instead determine if the second error count exceeds the first error count by a threshold, and may proceed to step 312 (instead of ending method 300) if such threshold is exceeded.

At step 312, in response to the occurrence of an error during the read request, failure analysis module 114 may cause the data read responsive to the read request to be rewritten to storage media 110. The result of such rewriting of data may be to: (i) correct error correction code data that may be damaged; (ii) automatically relocate sectors that are unreliable; and (iii) in a solid state drive, recharge memory cells that have partially discharged. After completion of step 312, method 300 may end.

Although FIG. 3 discloses a particular number of steps to be taken with respect to method 300, method 300 may be executed with greater or fewer steps than those depicted in FIG. 3. In addition, although FIG. 3 discloses a certain order of steps to be taken with respect to method 300, the steps comprising method 300 may be completed in any suitable order.

Method 300 may be implemented using information handling system 102 or any other system operable to implement method 300. In certain embodiments, method 300 may be implemented partially or fully in software and/or firmware embodied in computer-readable media.

Figure 4:
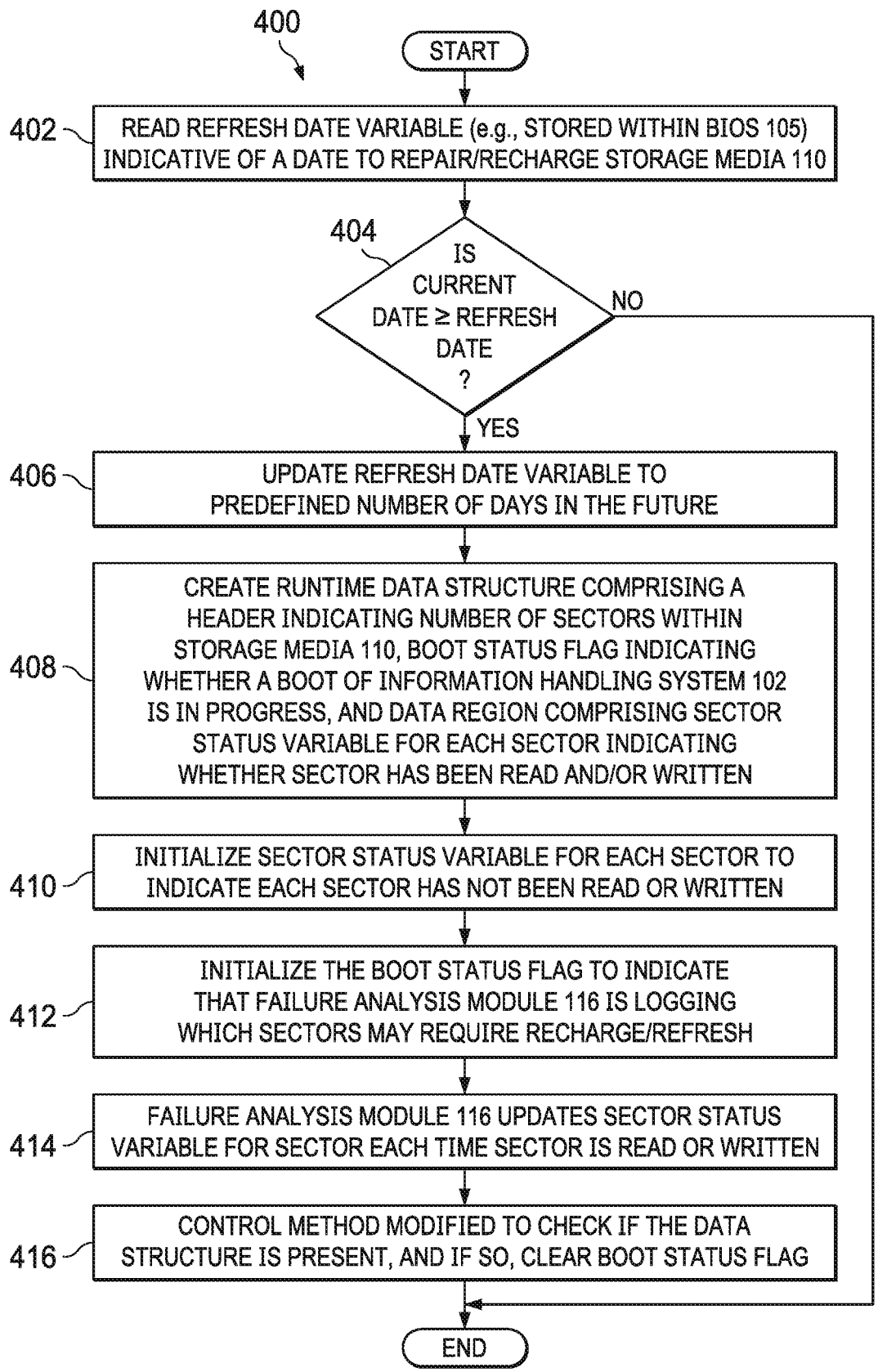
FIG. 4 illustrates a flow chart of an example method for enabling boot sector recharge/repair of storage media at regular periodic intervals using a failure analysis module of a BIOS, in accordance with embodiments of the present disclosure.

FIG. 4 illustrates a flow chart of an example method 400 for enabling boot sector recharge/repair of storage media 110 at regular periodic intervals using failure analysis module 116 of BIOS 105, in accordance with embodiments of the present disclosure. According to some embodiments, method 400 may begin at step 402. As noted above, teachings of the present disclosure may be implemented in a variety of configurations of information handling system 102. As such, the preferred initialization point for method 400 and the order of the steps comprising method 400 may depend on the implementation chosen.

At step 402, during loading of BIOS 105, failure analysis module 116 (which may execute as a storage media driver of BIOS 105) may read a refresh date variable (e.g., stored within BIOS 105) indicative of a date to repair/recharge storage media 110. At step 404, failure analysis module 116 may compare the current date to the date indicated by the refresh date variable. If the current date is the same as or later than the date indicated by the refresh date variable, method 400 may proceed to step 406. Otherwise, method 400 may end.

At step 406, failure analysis module 116 may update the refresh date variable to a predefined number of days in the future. In some embodiments, the predefined number of days may be set by a user or administrator of information handling system 102 (e.g., by modifying BIOS settings of information handling system 102).

At step 408, failure analysis module 116 may create a runtime data structure (e.g., an Advanced Configuration and Power Interface (ACPI) data structure), the data structure comprising a header indicating the number of sectors within storage media 110, a boot status flag indicating whether a boot of information handling system 102 is in progress, and a data region comprising a sector status variable for each sector indicating whether the sector has been read and/or written. In some embodiments, the sector status variable may be a two-bit variable. At step 410, failure analysis module 116 may initialize the sector status variable for each sector to indicate each sector has not been read or written (e.g., initialize to "00"). At step 412, failure analysis module 116 may initialize the boot status flag to indicate that failure analysis module 116 is logging which sectors may require recharge/refresh.

At step 414, if the data structure is present, failure analysis module 116 may update the sector status variable for a sector each time the sector is read or written to indicate whether the sector has been read or written. For example, if the sector is read, the sector status variable for such sector may be logically OR'ed with "01." As another example, if the sector is written, the sector status variable for such sector may be logically OR'ed with "10."

At step 416, a control method (e.g., an ACPI_WAK control method) may be modified to check if the data structure is present, and if so, clear the boot status flag. Such clearing of the boot status flag may stop a filter driver of operating system 106 from including subsequent sector reads in the list of sectors to recharge/refresh, as described below in connection with FIG. 5.

Although FIG. 4 discloses a particular number of steps to be taken with respect to method 400, method 400 may be executed with greater or fewer steps than those depicted in FIG. 4. In addition, although FIG. 4 discloses a certain order of steps to be taken with respect to method 400, the steps comprising method 400 may be completed in any suitable order.

Method 400 may be implemented using information handling system 102 or any other system operable to implement method 400. In certain embodiments, method 400 may be implemented partially or fully in software and/or firmware embodied in computer-readable media.

Figure 5:
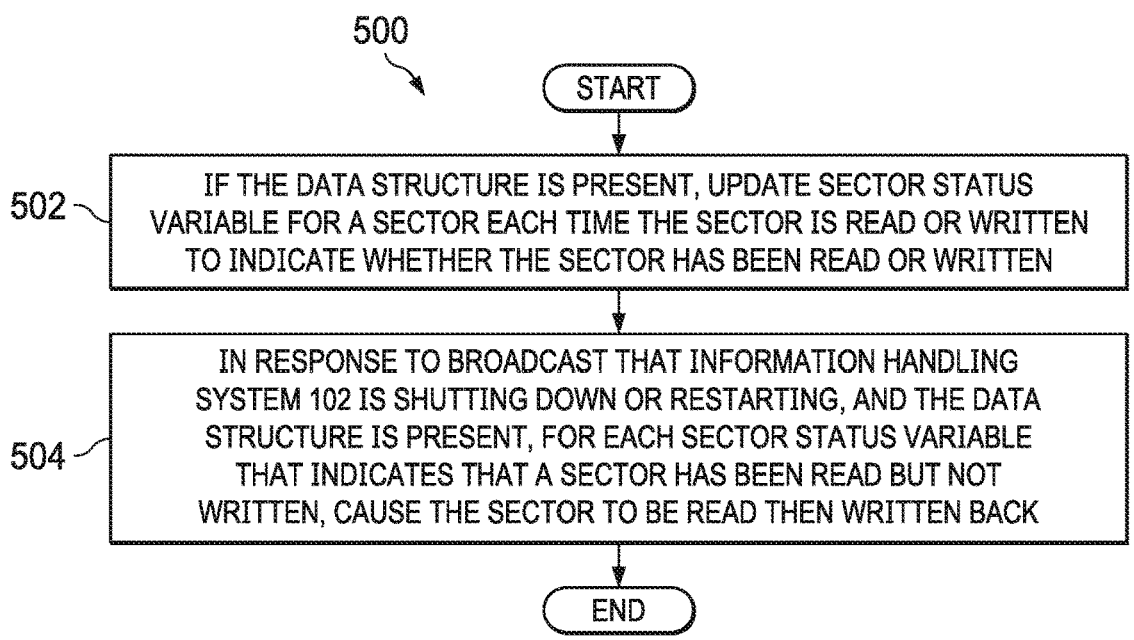
FIG. 5 illustrates a flow chart of an example method for enabling boot sector recharge/repair of storage media at regular periodic intervals using a failure analysis module of an operating system, in accordance with embodiments of the present disclosure.

FIG. 5 illustrates a flow chart of an example method 500 for enabling boot sector recharge/repair of storage media 110 at regular periodic intervals using failure analysis module 114 of operating system 106, in accordance with embodiments of the present disclosure. According to some embodiments, method 500 may begin at step 502. As noted above, teachings of the present disclosure may be implemented in a variety of configurations of information handling system 102. As such, the preferred initialization point for method 500 and the order of the steps comprising method 500 may depend on the implementation chosen.

At step 502, if the data structure created by failure analysis module 116 in method 400 is present, failure analysis module 114 may update the sector status variable for a sector each time the sector is read or written to indicate whether the sector has been read or written. For example, if the sector is read and the boot status flag is set, the sector status variable for such sector may be logically OR'ed with "01." As another example, if the sector is written, the sector status variable for such sector may be logically OR'ed with "10."

At step 504, in response to the filter driver of operating system 106 receiving an operating system broadcast that information handling system 102 is shutting down or restarting, and the data structure is present, failure analysis module 114 may, for each sector status variable that indicates that a sector has been read but not written (e.g., the sector status variable is "01), cause the sector to be read then written back.

Although FIG. 5 discloses a particular number of steps to be taken with respect to method 500, method 500 may be executed with greater or fewer steps than those depicted in FIG. 5. In addition, although FIG. 5 discloses a certain order of steps to be taken with respect to method 500, the steps comprising method 500 may be completed in any suitable order.

Method 500 may be implemented using information handling system 102 or any other system operable to implement method 500. In certain embodiments, method 500 may be implemented partially or fully in software and/or firmware embodied in computer-readable media.

Figure 6:
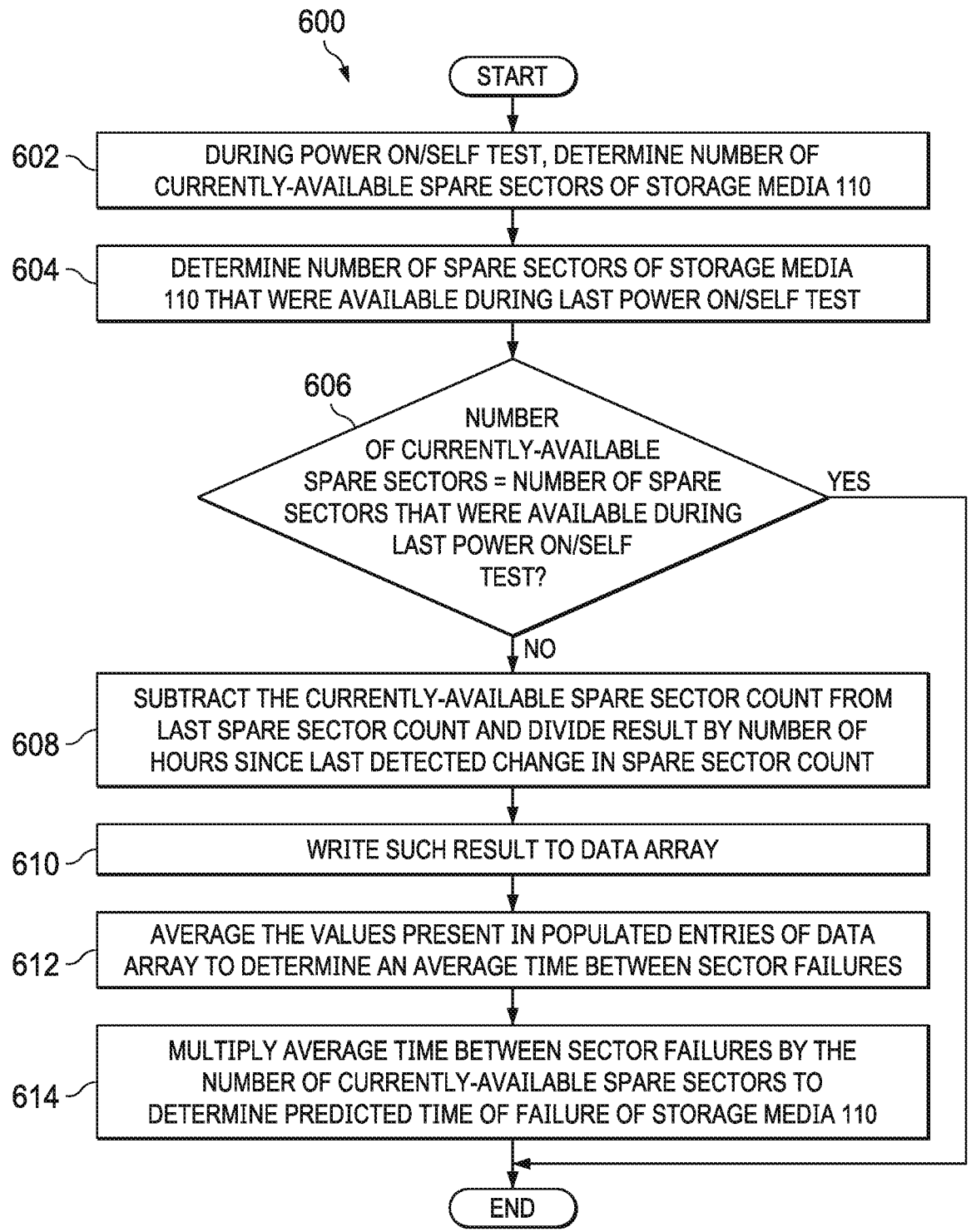
FIG. 6 illustrates a flow chart of an example method 600 for predicting a time of failure of storage media 110, in accordance with embodiments of the present disclosure.

FIG. 6 illustrates a flow chart of an example method 600 for predicting a time of failure of storage media 110, in accordance with embodiments of the present disclosure. According to some embodiments, method 600 may begin at step 602. As noted above, teachings of the present disclosure may be implemented in a variety of configurations of information handling system 102. As such, the preferred initialization point for method 600 and the order of the steps comprising method 600 may depend on the implementation chosen.

At step 602, during power on/self test of information handling system 102, failure analysis module 116 of BIOS 105 may determine a number of currently-available spare sectors of storage media 110. In some embodiments, such determination may be made by reading a variable stored in BIOS 105 or another computer-readable medium accessible to BIOS 105. At step 604, failure analysis module 116 of BIOS 105 may determine a number of spare sectors of storage media 110 that were available during the last power on/self test of information handling system 102. In some embodiments, such determination may be made by reading a variable stored in BIOS 105 or another computer-readable medium accessible to BIOS 105.

At step 606, failure analysis module 116 of BIOS 105 may determine whether the number of currently-available spare sectors and the number of spare sectors that were available during the last power on/self test are the same. If the numbers are the same, method 600 may end, and information handling system 102 may continue to boot. If the numbers are different, method 600 may proceed to step 608.

At step 608, failure analysis module 116 may subtract the currently-available spare sector count from the last spare sector count and divide by the number of hours since the last detected change in spare sector count. At step 610, failure analysis module 116 may write such result to a data array. In some embodiments, such data array may be a first-in/first-out buffer of a predetermined length (e.g., five entries).

At step 612, failure analysis module 116 may average the values present in populated entries of the data array to determine an average time between sector failures. At step 614, failure analysis module 116 may multiply such average time between sector failures by the number of currently-available spare sectors to determine a predicted number of hours before predicted failure of storage media 110, which in turn may be used to determine a predicted date of failure of storage array 110. In some embodiments, such predicted date may be stored and/or reported to a user or administrator of information handling system 102.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. A method of comprising, during a boot of an information handling system:
   detecting a soft failure associated with a read request to storage media of the information handling system wherein the soft failure is not visible to an operating system of the information handling system, wherein detecting soft failures comprises:
      responsive to an issuance of the read request, communicating a first status command to the storage media;
      receiving a response to the first status command including a first error count indicative of a number of read errors that have occurred within the storage media;
      responsive to a completion of the read request, communicating a second status command to the storage media;
      receiving a response to the second status command including a second error count indicative of a number of read errors that have occurred within the storage media; and
      determining whether the soft failure occurred based on a comparison of the first error count to the second error count; and
   in response to detecting the soft failure, rewriting a sector of the storage media affected by the soft failure to correct the soft failure.

2. The method of claim 1, wherein the method is performed by a basic input/output system of the information handling system.

3. The method of claim 1, wherein the method is performed by a filter driver of the operating system.

4. A method comprising, during boot of an information handling system:
   detecting a soft failure associated with a read request to storage media of the information handling system wherein the soft failure is not visible to an operating system of the information handling system;
   in response to detecting the soft failure, rewriting a sector of the storage media affected by the soft failure to correct the soft failure;
   determining if a condition for periodic refresh of boot sectors of the storage media has occurred; and
   responsive to occurrence of the condition, refreshing the boot sectors of the storage media.

5. The method of claim 4, wherein the condition is passage of a predetermined duration of time since a last refresh of boot sectors of the storage media.

6. A method comprising, during a boot of an information handling system:
   detecting a soft failure associated with a read request to storage media of the information handling system wherein the soft failure is not visible to an operating system of the information handling system;
   in response to detecting the soft failure, rewriting a sector of the storage media affected by the soft failure to correct the soft failure;
   determining an average rate of time between failures of sectors of the storage media; and
   based on the average rate of time between failures of sectors of the storage media and a number of currently-available spare sectors of the storage media, determining a predicted time of failure of the storage media.

7. An information handling system comprising:
   a processor; and
   a failure analysis module comprising a program of instructions, the failure analysis module configured to, when read and executed by the processor during a boot of the information handling system:
      detect a soft failure associated with a read request to storage media of the information handling system wherein the soft failure is not visible to an operating system of the information handling system, wherein detecting soft failures comprises:
         responsive to an issuance of the read request, communicating a first status command to the storage media;
         receiving a response to the first status command including a first error count indicative of a number of read errors that have occurred within the storage media;
         responsive to a completion of the read request, communicating a second status command to the storage media;
         receiving a response to the second status command including a second error count indicative of a number of read errors that have occurred within the storage media; and
         determining whether the soft failure occurred based on a comparison of the first error count to the second error count; and
      in response to detecting the soft failure, rewrite a sector of the storage media affected by the soft failure to correct the soft failure.

8. The information handling system of claim 7, wherein the failure analysis module is implemented by a basic input/output system of the information handling system.

9. The information handling system of claim 7, wherein the failure analysis module is implemented by a filter driver of the operating system.

10. An information handling system comprising:
    a processor; and
    a failure analysis module comprising a program of instructions, the failure analysis module configured to, when read and executed by the processor during a boot of the information handling system:
       detect a soft failure associated with a read request to storage media of the information handling system wherein the soft failure is not visible to an operating system of the information handling system;
       in response to detecting the soft failure, rewrite a sector of the storage media affected by the soft failure to correct the soft failure;
       determine if a condition for periodic refresh of boot sectors of the storage media has occurred; and
       responsive to occurrence of the condition, refresh the boot sectors of the storage media.

11. The information handling system of claim 10, wherein the condition is passage of a predetermined duration of time since a last refresh of boot sectors of the storage media.

12. An information handling system comprising:
    a processor; and
    a failure analysis module comprising a program of instructions, the failure analysis module configured to, when read and executed by the processor during a boot of the information handling system:

detect a soft failure associated with a read request to storage media of the information handling system wherein the soft failure is not visible to an operating system of the information handling system;

in response to detecting the soft failure, rewrite a sector of the storage media affected by the soft failure to correct the soft failure;

determine an average rate of time between failures of sectors of the storage media; and based on the average rate of time between failures of sectors of the storage media and a number of currently-available spare sectors of the storage media, determine a predicted time of failure of the storage media.

13. An article of manufacture comprising: a non-transitory computer-readable medium; and computer-executable instructions carried on the computer-readable medium, the instructions readable by a processor, the instructions, when read and executed, for causing the processor to, during a boot of the information handling system:

detect a soft failure associated with a read request to storage media of the information handling system wherein the soft failure is not visible to an operating system of the information handling system, wherein detecting soft failures comprises:

responsive to an issuance of the read request, communicating a first status command to the storage media;

receiving a response to the first status command including a first error count indicative of a number of read errors that have occurred within the storage media;

responsive to a completion of the read request, communicating a second status command to the storage media;

receiving a response to the second status command including a second error count indicative of a number of read errors that have occurred within the storage media; and determining whether the soft failure occurred based on a comparison of the first error count to the second error count; and in response to detecting the soft failure, rewrite a sector of the storage media affected by the soft failure to correct the soft failure.

14. The article of claim 13, wherein the instructions are implemented by a basic input/output system of the information handling system.

15. The article of claim 13, wherein the instructions are implemented by a filter driver of the operating system.

16. An article of manufacture comprising:

a non-transitory computer-readable medium; and computer-executable instructions carried on the computer-readable medium, the instructions readable by a processor, the instructions, when read and executed, for causing the processor to, during boot of the information handling system:

detect a soft failure associated with a read request to storage media of the information handling system wherein the soft failure is not visible to an operating system of the information handling system;

in response to detecting the soft failure, rewrite a sector of the storage media affected by the soft failure to correct the soft failure;

determine if a condition for periodic refresh of boot sectors of the storage media has occurred; and responsive to occurrence of the condition, refresh the boot sectors of the storage media.

17. The article of claim 16, wherein the condition is passage of a predetermined duration of time since a last refresh of boot sectors of the storage media.

18. An article of manufacture comprising:

a non-transitory computer-readable medium; and computer-executable instructions carried on the computer-readable medium, the instructions readable by a processor, the instructions, when read and executed, for causing the processor to, during boot of the information handling system:

detect a soft failure associated with a read request to storage media of the information handling system wherein the soft failure is not visible to an operating system of the information handling system;

in response to detecting the soft failure, rewrite a sector of the storage media affected by the soft failure to correct the soft failure;

determine an average rate of time between failures of sectors of the storage media; and based on the average rate of time between failures of sectors of the storage media and a number of currently-available spare sectors of the storage media, determine a predicted time of failure of the storage media.

* * * * *

UNITED STATES PATENT AND TRADEMARK OFFICE
CERTIFICATE OF CORRECTION

PATENT NO. : 11,126,502 B2
APPLICATION NO. : 16/421025
DATED : September 21, 2021
INVENTOR(S) : Chaiken et al.

It is certified that error appears in the above-identified patent and that said Letters Patent is hereby corrected as shown below:

In the Claims

In Column 11, Claim 1, Line 11, delete "method of comprising," and insert -- method comprising, --, therefor.

Signed and Sealed this
Twenty-ninth Day of November, 2022

Katherine Kelly Vidal
*Director of the United States Patent and Trademark Office*